(12) United States Patent
Aizawa et al.

(10) Patent No.: US 10,189,509 B2
(45) Date of Patent: Jan. 29, 2019

(54) VEHICULAR STRUCTURE

(71) Applicant: TOYOTA JIDOSHA KABUSHIKI KAISHA, Toyota-shi, Aichi-ken (JP)

(72) Inventors: Kai Aizawa, Toyota (JP); Masayuki Okano, Toyota (JP); Sho Sasaki, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 38 days.

(21) Appl. No.: 15/671,501

(22) Filed: Aug. 8, 2017

(65) Prior Publication Data

US 2018/0086390 A1 Mar. 29, 2018

(30) Foreign Application Priority Data

Sep. 28, 2016 (JP) ................................ 2016-190228

(51) Int. Cl.
| | | |
|---|---|---|
| *B62D 29/04* | (2006.01) | |
| *B32B 5/12* | (2006.01) | |
| *B32B 5/14* | (2006.01) | |
| *B32B 5/26* | (2006.01) | |
| *B60R 13/08* | (2006.01) | |

(Continued)

(52) U.S. Cl.
CPC .............. *B62D 29/043* (2013.01); *B32B 5/12* (2013.01); *B32B 5/145* (2013.01); *B32B 5/26* (2013.01); *B60R 13/0815* (2013.01); *B62D 25/14* (2013.01); *B62D 25/20* (2013.01); *B62D 29/04* (2013.01); *B29L 2031/3017* (2013.01);

(Continued)

(58) Field of Classification Search
CPC ...... B62D 29/043; B62D 25/14; B62D 25/20; B62D 29/04; B32B 5/12; B32B 5/145; B32B 5/26; B60R 13/0815
USPC .... 296/204, 203.01, 203.02, 203.04, 203.03, 296/193.07, 29, 209, 184.1, 187.08
See application file for complete search history.

(56) References Cited

U.S. PATENT DOCUMENTS 4,369,608 A * 1/1983 Miura ....................... B32B 3/28
52/309.9
5,560,967 A * 10/1996 Isaksen .................. B60J 5/0451
296/191

(Continued)

FOREIGN PATENT DOCUMENTS

| JP | S53-36223 U | 3/1978 |
|---|---|---|
| JP | S61-177984 U | 11/1986 |

(Continued)

OTHER PUBLICATIONS

Aug. 28, 2018 Decision to Grant issued in Japanese Patent Application No. 2016-190228.

*Primary Examiner* — Joseph D. Pape
(74) *Attorney, Agent, or Firm* — Oliff PLC

(57) ABSTRACT

There is provided a vehicular structure including (i) a vehicular panel member configured by resin including reinforcing fibers, and (ii) a joined portion of a vehicle body that supports, all the way around, a peripheral portion of a predetermined area of the panel member and to which the peripheral portion of the predetermined area is joined, wherein the panel member has a bulging shape where both front and back surfaces of the panel member bulge out such that the thickness of the panel member gradually becomes thicker from a peripheral end portion to a central portion within the predetermined area supported all the way around by the joined portion

8 Claims, 4 Drawing Sheets

(51) Int. Cl.
*B62D 25/14* (2006.01)
*B62D 25/20* (2006.01)
*B29L 31/30* (2006.01)

(52) U.S. Cl.
CPC . *B29L 2031/3055* (2013.01); *B32B 2307/102* (2013.01); *B32B 2605/08* (2013.01)

(56) References Cited

U.S. PATENT DOCUMENTS

| | | |
|---|---|---|
| 2010/0196736 A1 | 8/2010 | Boger et al. |
| 2011/0204678 A1* | 8/2011 | Katz .................... B62D 33/046 |
| | | 296/186.1 |
| 2013/0088033 A1* | 4/2013 | Wada ..................... B62D 21/00 |
| | | 296/29 |
| 2015/0137558 A1* | 5/2015 | Ayuzawa ........... B62D 25/2036 |
| | | 296/193.07 |
| 2016/0176445 A1* | 6/2016 | Ito ............................ B60K 1/04 |
| | | 296/193.07 |
| 2017/0113729 A1* | 4/2017 | Onishi ................. B62D 21/157 |

FOREIGN PATENT DOCUMENTS

| | | |
|---|---|---|
| JP | S63-232083 A | 9/1988 |
| JP | H4-193691 A | 7/1992 |
| JP | 2001-010542 | 1/2001 |
| JP | 2002-127944 A | 5/2002 |
| JP | 2004-291408 A | 10/2004 |
| JP | 2005-023691 A | 1/2005 |
| JP | 2008-302749 A | 12/2008 |
| JP | 2015-013392 A | 1/2015 |

\* cited by examiner

VEHICULAR STRUCTURE

CROSS-REFERENCE TO RELATED APPLICATION

This application claims priority under 35 USC 119 from Japanese Patent Application No. 2016-190228 filed on Sep. 28, 2016, the disclosure of which is incorporated by reference herein.

BACKGROUND

Technical Field

The present disclosure relates to a vehicular structure.

Related Art

Technologies for reducing vibration of a panel member are known. For example, see Japanese Patent Application Laid-open (JP-A) No. 2004-291408, U.S. Patent Application Publication No. 2010/0196736, and JP-A No. 2005-023691. Of these, JP-A No. 2004-291408 discloses a technology relating to a vibration damping composite material where a fiber-reinforced composite material layer and a gelated viscoelastic material layer are disposed in layers and integrated.

However, it is difficult to keep the weight low in a configuration that relies only on a high-density viscoelastic material layer to reduce vibration as in the above technology, so there is room for improvement from the standpoint of achieving a reduction in weight.

SUMMARY

The present disclosure obtains a vehicular structure that can reduce vibration of a panel member while achieving a reduction in weight.

A first aspect of the present disclosure is a vehicular structure including: a vehicular panel member configured by resin including reinforcing fibers; and a joined portion of a vehicle body that supports, all the way around, a peripheral portion of a predetermined area of the panel member and to which the peripheral portion of the predetermined area is joined, wherein the panel member has a bulging shape where both front and back surfaces of the panel member bulge out such that the thickness of the panel member gradually becomes thicker from a peripheral end portion to a central portion within the predetermined area supported all the way around by the joined portion.

According to the first aspect, the panel member is configured by resin including reinforcing fibers, so the panel member has a configuration advantageous to weight reduction. The peripheral portion of the predetermined area of the panel member is joined to, and supported all the way around by, the joined portion of the vehicle body. For this reason, in a case where the area of the panel member supported all the way around by the joined portion vibrates, that area of the panel member tends to elastically deform in the vibration direction an increasingly greater extent from the peripheral end portion to the central portion. To address this, in the present disclosure, the panel member has the bulging shape where both front and back surfaces of the panel member bulge out in such a way that the thickness of the panel member gradually becomes thicker from the peripheral end portion to the central portion of the area supported all the way around by the joined portion, so stiffness with respect to vibration is efficiently enhanced in the aforementioned area. Consequently, vibration in the aforementioned area is effectively reduced.

A second aspect of the present disclosure is a vehicular structure including: a vehicular panel member configured by resin including reinforcing fibers; and a joined portion of a vehicle body that supports, all the way around, a peripheral portion of a predetermined area of the panel member and to which the peripheral portion of the predetermined area is joined, wherein as regards the panel member, part of the predetermined area supported all the way around by the joined portion is a seat-like portion provided via a step portion with respect to at least part of the site joined to the joined portion, a connecting portion between the seat-like portion and the step portion is a ridgeline portion, and the seat-like portion has a bulging shape where both front and back surfaces of the seat-like portion bulge out such that the thickness of the seat-like portion gradually becomes thicker from a peripheral end portion to a central portion.

According to the second aspect, the panel member is configured by resin including reinforcing fibers, so the panel member has a configuration advantageous to weight reduction. The peripheral portion of the predetermined area of the panel member is joined to, and supported all the way around by, the joined portion of the vehicle body. Furthermore, as regards the panel member, part of the area supported all the way around by the joined portion is the seat-like portion provided via the step portion with respect to at least part of the site joined to the joined portion, and the connecting portion between the seat-like portion and the step portion is the ridgeline portion whose stiffness is relatively high. For this reason, in a case where the area of the panel member supported all the way around by the joined portion vibrates, the seat-like portion tends to elastically deform in the vibration direction an increasingly greater extent from the peripheral end portion thereof to the central portion. To address this, in the present disclosure, the seat-like portion of the panel member has the bulging shape where both front and back surfaces of the seat-like portion bulge out in such a way that the thickness of the seat-like portion gradually becomes thicker from the peripheral end portion to the central portion, so stiffness with respect to vibration is efficiently enhanced in the seat-like portion. Consequently, vibration of the seat-like portion is effectively reduced.

A third aspect of the present disclosure is the vehicular structure of the first aspect or the second aspect, wherein plural areas supported all the way around by the joined portion are set in the panel member, and the panel member has the bulging shape in each of the areas.

According to the third aspect, plural areas supported all the way around by the joined portion are set in the panel member, and the panel member has the bulging shape in each of the areas, so vibration is effectively reduced in each of the areas. For this reason, vibration is also effectively reduced in the panel member overall.

A fourth aspect of the present disclosure is the vehicular structure of any one of the first aspect to the third aspect, wherein, the reinforcing fibers are continuous fibers, a plurality of layers of the continuous fibers are disposed on top of each other as seen in the thickness direction of the panel member, and the number of layers of the continuous fibers is set greater in the central portion than in the peripheral end portion in the site having the bulging shape.

According to the fourth aspect, the number of layers of the continuous fibers is set greater in the central portion than in the peripheral end portion in the site having the bulging shape, so stiffness on the central portion with respect to vibration is effectively enhanced by the layers of the continuous fibers. Consequently, vibration of the panel member is even more effectively reduced.

A fifth aspect of the present disclosure is the vehicular structure of any one of the first aspect to the third aspect, wherein, in the site having the bulging shape, a layer of continuous fibers serving as the reinforcing fibers disposed along the bulging shape is included on both thickness direction ends of the panel member and a layer of continuous fibers is not included in the thickness direction middle layer of the panel member.

According to the fifth aspect, in the site having the bulging shape, a layer of continuous fibers disposed along the bulging shape is included on both thickness direction end portions of the panel member, so stiffness with respect to vibration is enhanced by the layers of the continuous fibers. Moreover, in the site having the bulging shape, a layer of continuous fibers is not included in the thickness direction middle layer of the panel member, so the panel member can be manufactured, for example, by sandwiching a resin material not including a layer of continuous fibers between a pair of sheet-like fiber-reinforced resin materials each equipped with a layer of continuous fibers and molding them by hot pressing. Consequently, when manufacturing the panel member, it is not necessary to carry out a setting such as changing, between the peripheral end portion and the central portion, the number of layers of the sheet-like fiber-reinforced resin materials to be layered.

As described above, according to the vehicular structure of the present disclosure, vibration of the panel member can be reduced while achieving a reduction in weight.

BRIEF DESCRIPTION OF THE DRAWINGS

An exemplary embodiment of the present disclosure will be described in detail based on the following figures, wherein.

DETAILED DESCRIPTION

Configuration of Embodiment

Figure 1:
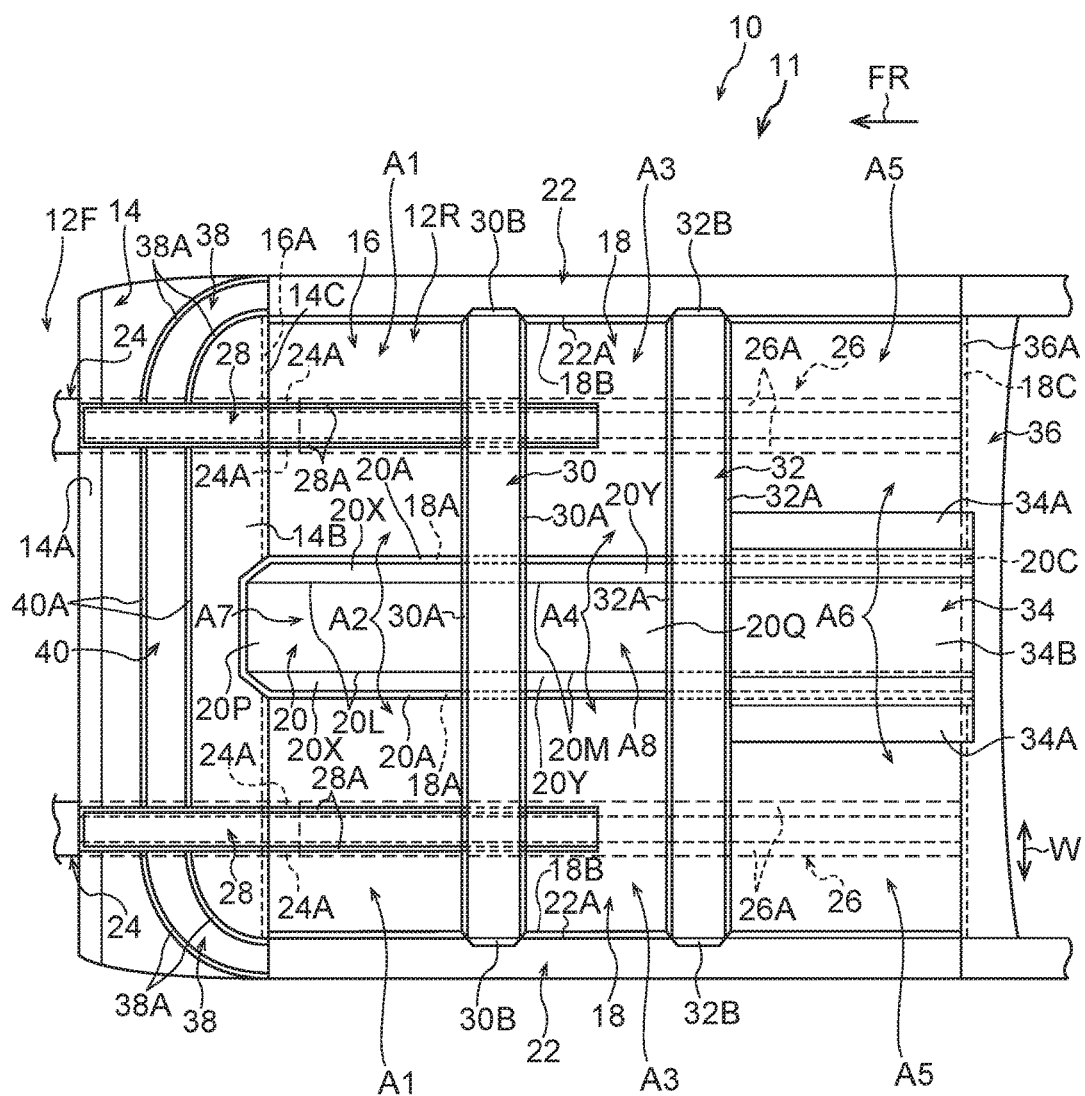
FIG. 1 is a plan view showing a vehicle body lower portion to which a vehicular structure pertaining to the embodiment of the present disclosure has been applied.

A vehicular structure 10 pertaining to an embodiment of the present disclosure will be described using FIG. 1 to FIG. 4. In FIG. 1, a vehicle body lower portion 11 to which the vehicular structure 10 pertaining to the present embodiment has been applied is shown by way of a plan view. It should be noted that in FIG. 1 arrow FR indicates the vehicle forward direction and arrow W indicates the vehicle width direction. Furthermore, in FIG. 1, configurations are shown simplified as appropriate in order to make it easier to see the drawing.

As shown in FIG. 1, a vehicle body front portion 12F (an engine compartment) and a cabin 12R are demarcated from each other by a dash panel 14. The upper portion of the dash panel 14 is a vertical wall portion 14A formed in a vertical wall shape, and the lower portion of the dash panel 14 is a toe board portion 14B provided integrally with the vertical wall portion 14A and formed in an inclined panel shape. The toe board portion 14B is inclined in the vehicle rearward direction heading in the vehicle downward direction. A front end portion 16A of a vehicle body floor 16 is joined to and integrated with a joined portion 14C that is a lower end portion of the toe board portion 14B.

The vehicle body floor 16 configures a floor surface of the cabin 12R. The vehicle body floor 16 is equipped with vehicle body floor panels 18 serving as a right and left pair of vehicular panel members and is equipped with a floor tunnel panel 20 serving as a vehicular panel member disposed in the vehicle width direction central portion of the vehicle body floor 16. The vehicle body floor panels 18 and the floor tunnel panel 20 are configured by resin including reinforcing fibers (as an example, carbon fibers) and, as an example, are made of a fiber-reinforced resin material whose reinforcing fibers (as an example, carbon fibers) are randomly oriented. The floor tunnel panel 20 is disposed with its longitudinal direction coinciding with the vehicle front and rear direction, and the cross-sectional shape of the floor tunnel panel 20 when cut along the vehicle width direction is a hat shape whose opening faces the vehicle downward direction. Joined portions 18A, which configure vehicle width direction inner end portions of the vehicle body floor panels 18, and flange portions 20A, which serve as joined portions configuring end portions on both sides of the floor tunnel panel 20, are joined to each other.

A right and left pair of rockers (also called side sills) 22 are provided on the vehicle width direction outer sides of the vehicle body floor panels 18. The rockers 22 are disposed with their longitudinal direction coinciding with the vehicle front and rear direction, and are high-stiffness skeletal members equipped with closed cross section portions extending in the vehicle front and rear direction. Vehicle width direction outer end portions 18B of the vehicle body floor panels 18 are joined to joined portions 22A on vehicle width direction inner side surfaces of the rockers 22.

Front side members 24 are disposed along the vehicle front and rear direction on both sides of the vehicle body front portion 12F. The front side members 24 are each equipped with a substantially rectangular closed cross section portion as seen in a vehicle front view in the vehicle body front portion 12F, are inclined along the lower surface of the toe board portion 14B of the dash panel 14, and extend as far as the lower surfaces on the front end portion of the vehicle body floor panels 18. The cross-sectional shape of the rear portions of the front side members 24 when cut along the vehicle width direction is a hat shape whose opening faces the vehicle upward direction, and flange portions 24A serving as right and left pairs of joined portions of the front side members 24 are joined to the lower surface of the toe board portion 14B and the lower surfaces on the front end portion of the vehicle body floor panels 18. Under reinforcements 26 are continuously connected to the rear end portions of the front side members 24. The under reinforcements 26 are disposed with their longitudinal direction coinciding with the vehicle front and rear direction, and the cross-sectional shape of the under reinforcements 26 when cut along the vehicle width direction is a hat shape whose opening faces the vehicle upward direction. Flange portions 26A serving as right and left pairs of joined portions of the under reinforcements 26 are joined to the lower surfaces of the vehicle body floor panels 18.

Upper members 28 for reinforcement are disposed on the upper sides of, so as to sandwich the dash panel 14 and the vehicle body floor panels 18 between themselves and, the rear end portions of the front side members 24 and the front portions of the under reinforcements 26. The upper members 28 are disposed along the vehicle front and rear direction as seen in a plan view, and the cross-sectional shape of the upper members 28 when cut along the vehicle width direction is a hat shape whose opening faces the vehicle downward direction. Flange portions 28A serving as right and left pairs of joined portions of the upper members 28 are joined to the dash panel 14 and the vehicle body floor panels 18.

Floor cross members 30 and 32 bridge, along the vehicle width direction, longitudinal direction middle layers of the right and left pair of rockers 22. The cross-sectional shape of the floor cross members 30 and 32 when cut along the vehicle front and rear direction is a hat shape whose opening faces the vehicle downward direction, and flange portions 30A and 32A serving as right and left pairs of joined portions of the floor cross members 30 and 32, respectively, are joined to the vehicle body floor panels 18 and the floor tunnel panel 20. Furthermore, flange portions 30B and 32B provided on vehicle width direction outer end portions of the floor cross members 30 and 32, respectively, are joined to the rockers 22.

Furthermore, the rear portion of the floor tunnel panel 20 is reinforced by a reinforcement member 34. The cross-sectional shape of the reinforcement member 34 when cut along the vehicle width direction is a hat shape whose opening faces the vehicle downward direction, flange portions 34A serving as joined portions of the reinforcement member 34 are joined to the vehicle body floor panels 18, and an upper wall portion 34B of the reinforcement member 34 is joined to the floor tunnel panel 20. Moreover, rear end portions 18C of the vehicle body floor panels 18 and a rear end portion 20C of the floor tunnel panel 20 are joined to a joined portion 36A that is a front end portion of a rear panel 36.

The front end portions of the rockers 22 and the front portions of the upper members 28 are coupled to each other by dash cross members 38. Furthermore, the front portions of the upper members 28 are coupled to each other in the vehicle body width direction by a dash cross member 40. The cross-sectional shape of the dash cross members 38 and 40 when cut along a direction orthogonal to their longitudinal direction is a hat shape whose opening faces the vehicle downward direction, and flange portions 38A and 40A of the dash cross members 38 and 40, respectively, are joined to the dash panel 14.

Peripheral portions of first areas A1, which are sites on the vehicle width direction outer sides of the front portions of the vehicle body floor panels 18, are supported all the way around by the dash panel 14, the rockers 22, the floor cross member 30, the upper members 28, the floor side members 24, and the under reinforcements 26 joined to the vehicle body floor panels 18. Furthermore, peripheral portions of second areas A2, which are sites on the vehicle width direction inner sides of the front portions of the vehicle body floor panels 18, are supported all the way around by the dash panel 14, the floor tunnel panel 20, the floor cross member 30, the upper members 28, the front side members 24, and the under reinforcements 26 joined to the vehicle body floor panels 18.

Peripheral portions of third areas A3, which are sites on the vehicle width direction outer sides of the vehicle front and rear direction middle portions of the vehicle body floor panels 18, are supported all the way around by the floor cross member 30, the rockers 22, the floor cross member 32, the under reinforcements 26, and the upper members 28 joined to the vehicle body floor panels 18. Furthermore, peripheral portions of fourth areas A4, which are sites on the vehicle width direction inner sides of the vehicle front and rear direction middle portions of the vehicle body floor panels 18, are supported all the way around by the floor cross member 30, the floor tunnel panel 20, the floor cross member 32, the under reinforcements 26, and the upper members 28 joined to the vehicle body floor panels 18.

Peripheral portions of fifth areas A5, which are sites on the vehicle width direction outer sides of the rear portions of the vehicle body floor panels 18, are supported all the way around by the floor cross member 32, the rockers 22, the rear panel 36, and the under reinforcements 26 joined to the vehicle body floor panels 18. Furthermore, peripheral portions of sixth areas A6, which are sites on the vehicle width direction inner sides of the rear portions of the vehicle body floor panels 18, are supported all the way around by the floor cross member 32, the under reinforcements 26, the rear panel 36, the floor tunnel panel 20, and the reinforcement member 34 joined to the vehicle body floor panels 18.

Figure 2:
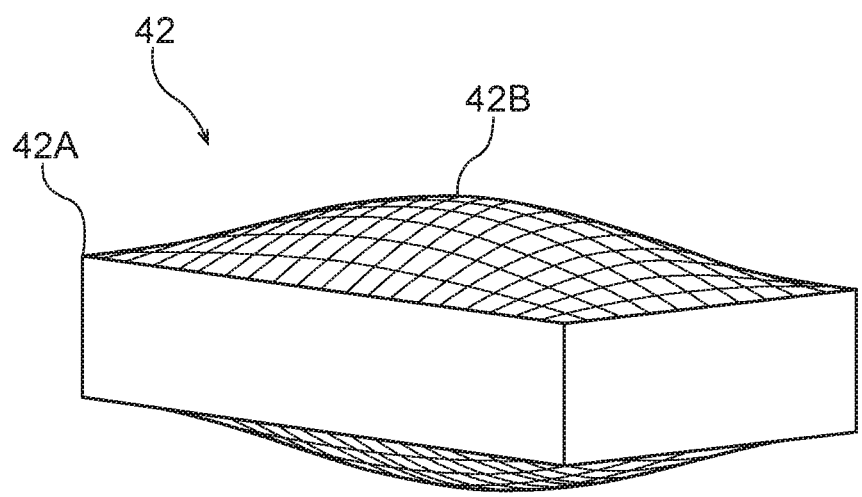
FIG. 2 is a perspective view showing a modeling of part of a structure of a panel member applied to the vehicular structure pertaining to the embodiment of the present disclosure.
Figure 4:
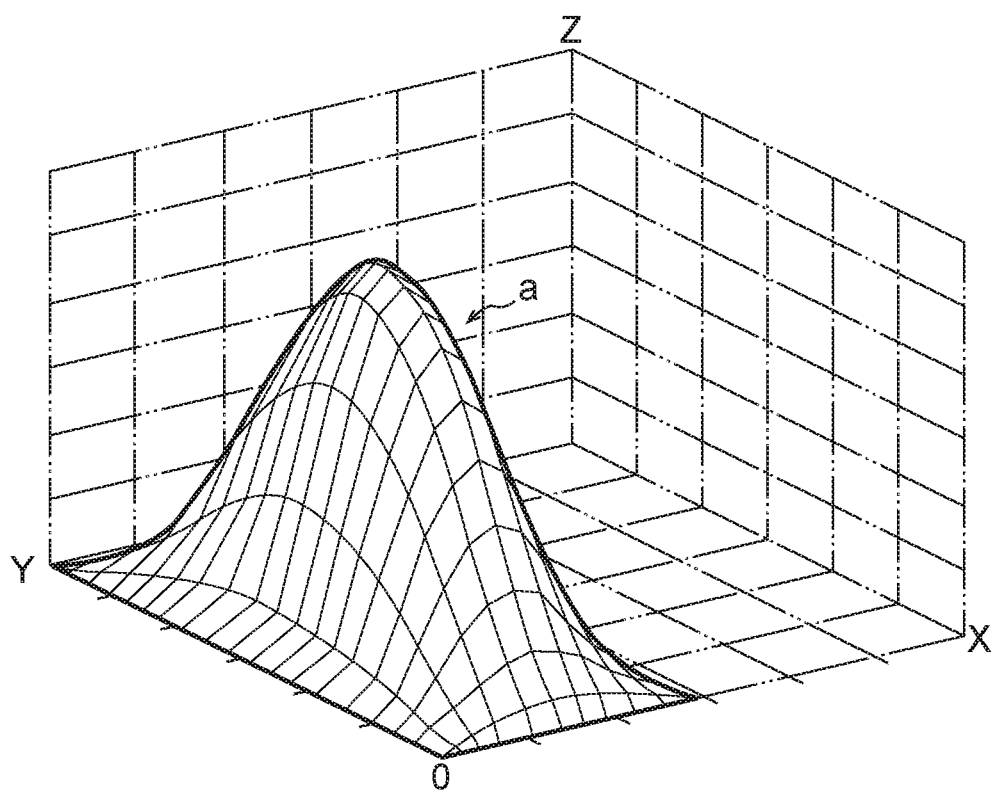
FIG. 4 is a drawing showing an example of a common primary vibration mode shape calculated using a computer.

The first areas A1, the second areas A2, the third areas A3, the fourth areas A4, the fifth areas A5, and the sixth areas A6 (hereinafter shortened to "the first areas A1 to the sixth areas A6") each have a bulging shape where both front and back surfaces of the area bulge out in such a way that the thickness of the area gradually becomes thicker from the peripheral end portion to the central portion. A panel member 42 in which the first areas A1 to the sixth areas A6 of the vehicle body floor panels 18 are modeled is shown by way of a perspective view in FIG. 2. It should be noted that FIG. 2 is also an example showing the extent to which the aforementioned bulging shape bulges out with respect to the thickness of the peripheral end portion, and shows the thickness as being thick in order to show the bulging shape in a way that is easier to understand. Furthermore, in FIG. 2, ruled lines are added to the front surface and the back surface of the panel member 42 in order to show the bulging shape of the panel member 42 in a way that is easier to understand. Furthermore, FIG. 4 shows an example of a common primary vibration mode shape a calculated using a computer and shows amounts of displacement at various sites in a case where a panel has gone from a shape in a non-vibrating state to the primary vibration mode shape a. It should be noted that in FIG. 4 the lengths meant by the single graduations on the X-axis and the Y-axis are set longer than the lengths meant by the single graduations on the Z-axis. Furthermore, FIG. 4 shows an example where the panel has undergone bending deformation upward in the drawing, but naturally the panel likewise also undergoes bending deformation downward in the drawing.

The panel member 42 shown in FIG. 2 is set to a bulging shape where both front and back surfaces of the panel member 42 bulge out in such a way that the thickness of the panel member 42 gradually becomes thicker from a peripheral end portion 42A side shown in FIG. 2 to a central portion 42B side in accordance with (more specifically, in proportion to) the amounts of displacement at the various sites of the panel shown in FIG. 4. That is, the panel member 42 has a configuration capable of reducing the vibration level of primary resonance. The panel member 42 has a structure where the mass on the central portion 42B side is increased by gradually making the thickness of the panel member 42 thicker from the peripheral end portion 42A side to the central portion 42B side.

As shown in FIG. 1, a peripheral portion of a seventh area A7 provided in the front portion of the floor tunnel panel 20 is supported all the way around by the dash panel 14, the right and left pair of vehicle body floor panels 18, and the floor cross member 30 joined to the floor tunnel panel 20. Part of the seventh area A7 is a seat-like portion 20P (upper wall portion) provided via step portions 20X with respect to the flange portions 20A of the floor tunnel panel 20, and connecting portions between the seat-like portion 20P and the step portions 20X are ridgeline portions 20L.

A peripheral portion of an eighth area A8 provided in the vehicle front and rear direction middle portion of the floor tunnel panel 20 is supported all the way around by the floor cross member 30, the right and left pair of vehicle body floor panels 18, and the floor cross member 32 joined to the floor tunnel panel 20. Part of the eighth area A8 is a seat-like portion 20Q (upper wall portion) provided via step portions 20Y with respect to the flange portions 20A of the floor tunnel panel 20, and connecting portions between the seat-like portion 20Q and the step portions 20Y are ridgeline portions 20M.

The seat-like portion 20P of the seventh area A7 and the seat-like portion 20Q of the eighth area A8 of the floor tunnel panel 20 each have a bulging shape where both front and back surfaces of the seat-like portion bulge out in such a way that the thickness of the seat-like portion gradually becomes thicker from the peripheral end portion to the central portion. This bulging shape is, as in the first areas A1 to the sixth areas A6 of the vehicle body floor panels 18, set to a shape such as the one modeled and shown in FIG. 2 as an example.

Operation of Embodiment

Next, the operation of the above-described embodiment will be described.

According to the above-described configuration, the vehicle body floor panels 18 shown in FIG. 1 are each configured by resin including reinforcing fibers, so the vehicle body floor panels 18 each have a configuration advantageous to weight reduction. Each peripheral portion of the first areas A1 to the sixth areas A6 of the vehicle body floor panels 18 has its four sides as seen in a vehicle plan view joined (restrained) to, and is supported all the way around by, the vehicle body. For this reason, in a case where the first areas A1 to the sixth areas A6 vibrate, those areas tend to elastically deform in the vibration direction an increasingly greater extent from the peripheral end portion to the central portion (i.e., the portion tending to become the antinode of the vibration) with the restrained four sides serving as the node of the vibration. To address this, in the present embodiment, each of the vehicle body floor panels 18 has, in the first areas A1 to the sixth areas A6 each of whose four sides are joined (restrained) to the vehicle body, the bulging shape where both front and back surfaces of the vehicle body floor panel 18 bulge out in such a way that the thickness of the vehicle body floor panel 18 gradually becomes thicker from the peripheral end portion to the central portion, so stiffness with respect to vibration is efficiently enhanced in the first areas A1 to the sixth areas A6. Consequently, vibration in each area of the first areas A1 to the sixth areas A6 is effectively reduced.

Furthermore, in the above-described configuration, the floor tunnel panel 20 is also configured by resin including reinforcing fibers, so the floor tunnel panel 20 has a configuration advantageous to weight reduction. Each peripheral portion of the seventh area A7 and the eighth area A8 of the floor tunnel panel 20 has its four sides as seen in a vehicle plan view joined (restrained) to, and is supported all the way around by, the vehicle body. Additionally, part of the seventh area A7 is the seat-like portion 20P provided via the step portions 20X with respect to the flange portions 20A of the floor tunnel panel 20, and the connecting portions between the seat-like portion 20P and the step portions 20X are the ridgeline portions 20L. Furthermore, part of the eighth area A8 is the seat-like portion 20Q provided via the step portions 20Y with respect to the flange portions 20A of the floor tunnel panel 20, and the connecting portions between the seat-like portion 20Q and the step portions 20Y are the ridgeline portions 20M.

Here, the ridgeline portions 20L and 20M configuring parts of the peripheral end portion of the seat-like portions 20P and 20Q in the floor tunnel panel 20 are relatively high in stiffness, and the sections of the peripheral end portions of the seat-like portions 20P and 20Q other than the ridgeline portions 20L and 20M are fixed ends. For this reason, the seat-like portions 20P and 20Q in the floor tunnel panel 20 can be said to be sections that vibrate relatively easily. Additionally, in a case where the seventh area A7 and the eighth area A8 vibrate, the seat-like portions 20P and 20Q tend to elastically deform in the vibration direction an increasingly greater extent from the peripheral end portion to the central portion.

To address this, in the present embodiment, the seat-like portion 20P of the seventh area A7 and the seat-like portion 20Q of the eighth area A8 of the floor tunnel panel 20 each have the bulging shape where both front and back surfaces of the seat-like portion bulge out in such a way that the thickness of the seat-like portion gradually becomes thicker from the peripheral end portion to the central portion, so stiffness with respect to vibration is efficiently enhanced in the seat-like portions 20P and 20Q. Consequently, vibration of the seat-like portions 20P and 20Q of the floor tunnel panel 20 is effectively reduced.

Furthermore, in the above-described configuration, the vehicle body floor panels 18 and the floor tunnel panel 20 have the aforementioned bulging shape in each area of the first areas A1 to the sixth areas A6 of the vehicle body floor panels 18 and in each area of the seventh area A7 and the eighth area A8 of the floor tunnel panel 20, so vibration is effectively reduceed in each of the first areas A1 to the sixth areas A6 as well as in each of the seventh area A7 and the eighth area A8. For this reason, vibration is also effectively reduced in the vehicle body floor panels 18 overall and in the floor tunnel panel 20 overall.

As described above, in the vehicle body lower portion 11 to which the vehicular structure 10 of the present embodiment has been applied, vibration of the vehicle body floor panels 18 and the floor tunnel panel 20 can be reduced while achieving a reduction in weight.

As supplemental description, when the material of the panel member is changed from, for example, a steel material to a fiber-reinforced resin material, vibration performance ends up changing for the worse. However, in the configuration of the present embodiment, the vibration level can be reduced because the panel member has the bulging shape (see FIG. 2) as described above. Additionally, discomfort and muffled noise caused by vibration can be reduced owing to the reduction in the vibration level.

Furthermore, in the present embodiment, the vehicle body floor panels 18 and the floor tunnel panel 20 are made of a fiber-reinforced resin material whose reinforcing fibers are randomly oriented, and have a structure where the fiber-reinforced resin material in which the orientation of the reinforcing fibers is random can be molded by hot pressing or injection molding, so their productivity is good. It should be noted that in a case where the panels are molded by hot pressing, a sheet-like fiber-reinforced resin material (a stampable sheet) is applied.

Moreover, in the present embodiment, by providing the bulging shape in the first areas A1 to the sixth areas A6 of the vehicle body floor panels 18, there is also the advantage that, for example, water that has gotten on the vehicle body floor panels 18 does not stay on the vehicle body floor panels 18 but flows to the end portion of the vehicle body floor panels 18.

Modified Examples of Embodiment

Figure 3A:
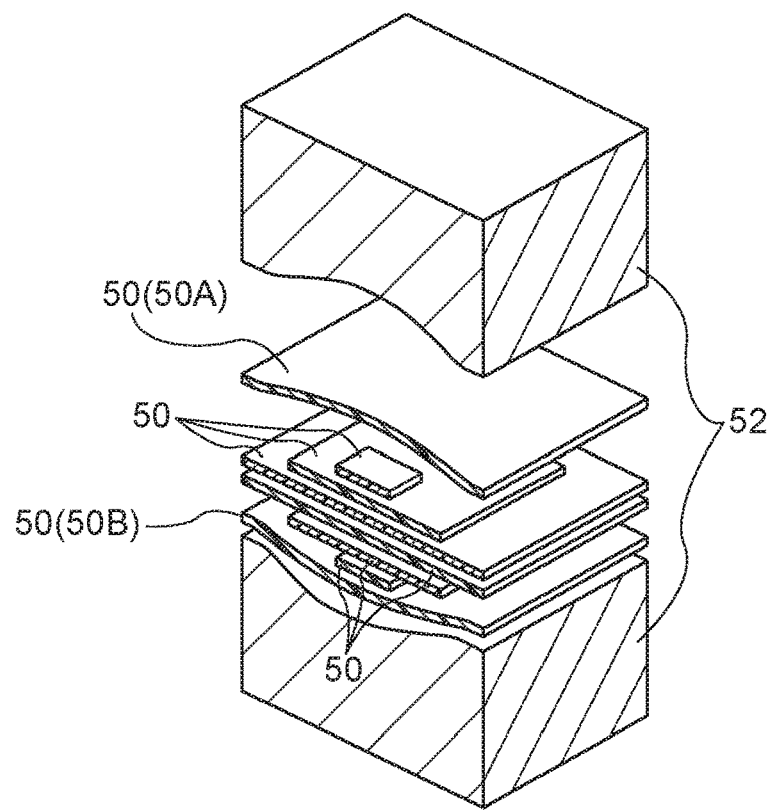
FIG. 3A is a schematic perspective view showing a first example of a method of manufacturing the panel member applied to the vehicular structure.

It should be noted that, as a modified example of the above-described embodiment, the panel member (in the above-described embodiment, the vehicle body floor panels 18 and the floor tunnel panel 20) may also be a panel member where the reinforcing fibers are continuous fibers (as an example, continuous carbon fibers), plural layers of the continuous fibers are disposed on top of each other as seen in the thickness direction of the panel member, and the number of layers of the continuous fibers is set greater in the central portion than in the peripheral end portion in the site having the bulging shape (see FIG. 2). According to this kind of configuration, in the site having the bulging shape, stiffness on the central portion with respect to vibration is effectively enhanced by the layers of the continuous fibers, so vibration of the panel member is even more effectively reduced. It should be noted that vibration of the panel member can be reduced even more if the direction of the continuous fibers is aligned with the longitudinal direction of the panel member as seen in a plan view of the panel member. In FIG. 3A, part of the process of manufacturing the panel member pertaining to the above-described modified example is shown by way of a schematic perspective view. It should be noted that the cross section on the near side of the drawing in FIG. 3A is a cross section passing through the vicinity of that part of the panel member that becomes the top portion of the bulge. Furthermore, sheets 50 shown in FIG. 3A are each configured by fiber-reinforced resin having one layer of continuous fibers.

A method of manufacturing the panel member shown in FIG. 3A will now be generally described. First, the numerous fiber-reinforced resin sheets 50 are layered on top of each other. At that time, the numerous sheets 50 are disposed in such a way that the number of layers on the side that becomes the peripheral end portion is smaller and the number of layers on the side that becomes the central portion is greater. In this connection, in the example in FIG. 3A, sheets of a size ranging from the site that becomes the central portion to the site that becomes the peripheral end portion in a case where the panel member to be manufactured is seen in its thickness direction are used for an uppermost sheet 50A and a lowermost sheet 50B so that the front surface and the back surface of the panel member to be manufactured are finished into smooth surfaces. It should be noted that in FIG. 3A, in order to make the drawing easier to see, the thickness of the sheets 50 is exaggerated and the sheets 50 to be layered are separated from each other in their thickness direction. After the sheets 50 have been disposed, a panel member equipped with a predetermined bulging shape can be manufactured by hot pressing using molds 52.

Furthermore, as another modified example of the above-described embodiment, the panel member (in the above-described embodiment, the vehicle body floor panels 18 and the floor tunnel panel 20 shown in FIG. 1) may also have a configuration where, in the site having the bulging shape (see FIG. 2), a layer of continuous fibers (as an example, continuous carbon fibers) serving as the reinforcing fibers disposed along the bulging shape is included on both thickness direction ends of the panel member and a layer of continuous fibers is not included in the thickness direction middle layer of the panel member. In that kind of configuration, a layer of continuous fibers disposed along the bulging shape is included on both thickness direction ends of the panel member, so stiffness with respect to vibration is enhanced by the layers of continuous fibers.

Figure 3B:
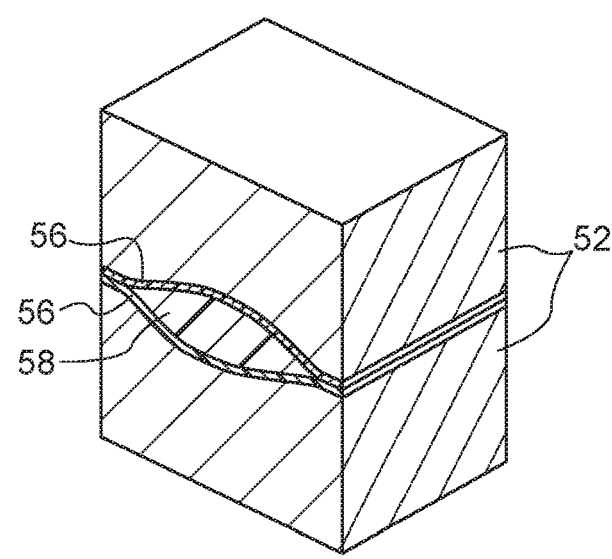
FIG. 3B is a schematic perspective view showing a second example of a method of manufacturing the panel member applied to the vehicular structure.

In FIG. 3B, part of the process of manufacturing the panel member pertaining to that kind of modified example is shown by way of a schematic perspective view. It should be noted that the cross section on the near side of the drawing in FIG. 3B is a cross section passing through the vicinity of that part of the panel member that becomes the top portion of the bulge. Furthermore, sheet-like fiber-reinforced resin materials 56 shown in FIG. 3B are each a resin material having one layer of continuous fibers, and a resin material 58 configuring the middle layer does not include a layer of reinforcing fibers. A method of manufacturing the panel member shown in FIG. 3B will now be generally described. The panel member is obtained by disposing, so as to sandwich, the resin material 58 between the upper and lower pair of fiber-reinforced resin materials 56 (the shapes of the fiber-reinforced resin materials 56 and the resin material 58 at this point in time are not shown in the drawing) and hot pressing them using molds 52 to thereby compress and mold mainly the resin material 58. It should be noted that in FIG. 3B, in order to make the drawing easier to see, the thicknesses of the fiber-reinforced resin materials 56 and the resin material 58 are exaggerated. Furthermore, the resin material 58 is formed in a bulging shape that is a size smaller than the bulging shape (see FIG. 2) of the panel member to be manufactured. For the resin configuring the resin material 58, as an example, resin different from the resin applied to the fiber-reinforced resin materials 56 is applied. However, the same resin as the resin applied to the fiber-reinforced resin materials 56 may also be applied to the resin configuring the resin material 58. Furthermore, the resin material 58 may also be a fiber-reinforced resin material whose reinforcing fibers are randomly oriented. In a case resulting from this manufacturing method, when manufacturing the panel member, it is not necessary to carry out a setting such as changing, between the peripheral end portion and the central portion, the number of layers of the sheet-like fiber-reinforced resin materials 56 to be layered, and it also becomes possible to keep manufacturing costs down.

Supplemental Description of Embodiment

It should be noted that although in the above-described embodiment the vehicular structure of the present disclosure is applied to a part including the vehicle body floor 16 shown in FIG. 1, the vehicular structure may also be applied to parts other than a part including the vehicle body floor 16, such as a structural part including a rear floor pan as the panel member, a structural part including a vehicle body roof as the panel member, or a structural part including a hood outer panel as the panel member.

Furthermore, the vehicular structure may also have a configuration where, for example, a rear floor pan serving as a vehicular panel member made of fiber-reinforced resin whose peripheral portion is fixed is provided with a storage recess portion that is formed in a recessed shape and is for storing a spare tire, with a bottom wall portion of the storage recess portion having the bulging shape of the present disclosure. That is, the vehicular structure may also have a configuration where connecting portions between side wall portions of the storage recess portion serving as step portions and the bottom wall portion of the storage recess portion serving as a seat-like portion are ridgeline portions and where the bottom wall portion of the storage recess portion has a bulging shape where both front and back surfaces of the bottom wall portion bulge out in such a way that the thickness of the bottom wall portion gradually becomes thicker from the peripheral end portion to the central portion.

Furthermore, in the above-described embodiment, the bulging shape set in each area of the first areas A1 to the sixth areas A6 of the vehicle body floor panels 18 as well as in the seventh area A7 and in the eighth area A8 of the floor tunnel panel 20 is set in proportion to the primary vibration mode shape, but the bulging shape set in the predetermined area of the panel member may also be a shape where both front and back surfaces of the panel member bulge out in such a way that the thickness of the panel member gradually becomes thicker from the peripheral end portion to the central portion of the predetermined area or from the peripheral end portion to the central portion of the seat-like portion (20P, 20Q) even though it is a little different from a shape proportional to the amounts of displacement at the various sites in a case where the panel has gone from a shape in a non-vibrating state to the primary vibration mode shape.

Furthermore, in the above-described embodiment, plural areas supported all the way around by joined portions are set in the vehicle body floor panels 18 and the floor tunnel panel 20 serving as panel members, but just one area supported all the way around by joined portions of the vehicle body may also be set in the panel member.

Furthermore, in the above-described embodiment, carbon fibers are applied as the reinforcing fibers included in the resin, but known reinforcing fibers other than carbon fibers, such as glass fibers for example, may also be applied as the reinforcing fibers included in the resin.

It should be noted that the above-described embodiment and the aforementioned plural modified examples can also be combined where appropriate and implemented.

An example of embodiments the present disclosure has been described above, but the present disclosure is not limited to what has been described above and of course can, in addition to what has been described above, be modified and implemented in a variety of ways to the extent that they do not depart from the spirit thereof.

What is claimed is:

1. A vehicular structure comprising:
   a vehicular panel member configured by resin including reinforcing fibers; and
   a joined portion of a vehicle body that supports, all the way around, a peripheral portion of a predetermined area of the panel member and to which the peripheral portion of the predetermined area is joined,
   wherein the panel member has a bulging shape where both front and back surfaces of the panel member bulge out such that the thickness of the panel member gradually becomes thicker from a peripheral end portion to a central portion within the predetermined area supported all the way around by the joined portion.

2. A vehicular structure comprising:
   a vehicular panel member configured by resin including reinforcing fibers; and
   a joined portion of a vehicle body that supports, all the way around, a peripheral portion of a predetermined area of the panel member and to which the peripheral portion of the predetermined area is joined,
   wherein as regards the panel member, part of the predetermined area supported all the way around by the joined portion is a seat-like portion provided via a step portion with respect to at least part of the site joined to the joined portion, a connecting portion between the seat-like portion and the step portion is a ridgeline portion, and the seat-like portion has a bulging shape where both front and back surfaces of the seat-like portion bulge out such that the thickness of the seat-like portion gradually becomes thicker from a peripheral end portion to a central portion.

3. The vehicular structure according to claim 1, wherein a plurality of predetermined areas supported all the way around by the joined portion are set in the panel member, and the panel member has the bulging shape in each of the predetermined areas.

4. The vehicular structure according to claim 1, wherein the reinforcing fibers are continuous fibers,
   a plurality of layers of the continuous fibers are disposed on top of each other as seen in the thickness direction of the panel member, and
   the number of layers of the continuous fibers is set greater in the central portion than in the peripheral end portion in the site having the bulging shape.

5. The vehicular structure according to claim 1, wherein, in the site having the bulging shape, a layer of continuous fibers serving as the reinforcing fibers disposed along the bulging shape is included on both thickness direction ends of the panel member and a layer of continuous fibers is not included in the thickness direction middle layer of the panel member.

6. The vehicular structure according to claim 2, wherein a plurality of predetermined areas supported all the way around by the joined portion are set in the panel member, and the panel member has the bulging shape in each of the predetermined areas.

7. The vehicular structure according to claim 2, wherein the reinforcing fibers are continuous fibers,
   a plurality of layers of the continuous fibers are disposed on top of each other as seen in the thickness direction of the panel member, and
   the number of layers of the continuous fibers is set greater in the central portion than in the peripheral end portion in the site having the bulging shape.

8. The vehicular structure according to claim 2, wherein, in the site having the bulging shape, a layer of continuous fibers serving as the reinforcing fibers disposed along the bulging shape is included on both thickness direction ends of the panel member and a layer of continuous fibers is not included in the thickness direction middle layer of the panel member.

* * * * *